United States Patent
Guevel (10) Patent No.: US 11,333,030 B2
(45) Date of Patent: May 17, 2022

(54) DYNAMIC SLEEVE SEAL FITTINGS

(71) Applicant: UNITED TECHNOLOGIES CORPORATION, Farmington, CT (US)

(72) Inventor: Edward Guevel, Dallas, TX (US)

(73) Assignee: Raytheon Technologies Corporation, Farmington, CT (US)

( * ) Notice: Subject to any disclaimer, the term of this patent is extended or adjusted under 35 U.S.C. 154(b) by 295 days.

(21) Appl. No.: 16/396,115

(22) Filed: Apr. 26, 2019

(65) Prior Publication Data

US 2020/0340368 A1 Oct. 29, 2020

(51) Int. Cl.
*F16L 21/03* (2006.01)
*F01D 9/06* (2006.01)
*F16L 21/08* (2006.01)
*F16L 37/107* (2006.01)

(52) U.S. Cl.
CPC .............. *F01D 9/06* (2013.01); *F16L 21/03* (2013.01); *F16L 21/08* (2013.01); *F16L 37/107* (2013.01)

(58) Field of Classification Search
CPC . F16L 17/02; F16L 17/06; F16L 21/03; F16L 21/035; F16L 21/04; F16L 21/05; F16L 27/08; F16L 27/0812; F16L 27/0816; F16L 27/082
USPC ... 285/145.1–145.4, 95, 100, 109, 187, 272, 285/345, 346, 351, 374, 331
See application file for complete search history.

(56) References Cited

U.S. PATENT DOCUMENTS

| 4,626,001 | A | 12/1986 | Lee | |
|---|---|---|---|---|
| 4,854,615 | A * | 8/1989 | Smith, III | E21B 33/038 285/331 |
| 9,752,706 | B2 | 9/2017 | Bauerdick et al. | |
| 2010/0215477 | A1* | 8/2010 | Wilson | F01D 21/003 415/118 |
| 2018/0202591 | A1 | 11/2018 | Tajiri et al. | |

FOREIGN PATENT DOCUMENTS

| DE | 110356 | 6/1899 |
|---|---|---|
| DE | 88869 | 3/1972 |
| DE | 2455645 | 6/1975 |
| GB | 2095779 | 10/1982 |
| WO | 2012155287 | 11/2012 |

OTHER PUBLICATIONS

European Patent Office, European Search Report dated Aug. 14, 2020 in Application No. 20171043.1.

* cited by examiner

*Primary Examiner* — Aaron M Dunwoody
(74) *Attorney, Agent, or Firm* — Snell & Wilmer L.L.P.

(57) ABSTRACT

A dynamic sleeve seal fitting including a first sleeve having a tongue portion, a second sleeve having a groove configured to receive the tongue portion, and a first seal member coupled to at least one of the tongue portion or the groove. The first seal being configured to generate a seal between the first sleeve and the second sleeve in response to inserting the tongue portion into the groove.

15 Claims, 7 Drawing Sheets

DYNAMIC SLEEVE SEAL FITTINGS

FIELD

The disclosure relates generally to fittings for fluid systems and more particularly to interconnections between fluid conduits.

BACKGROUND

Fluid conduits such as metal tubes may tend to experience thermal growth in high temperature environments such as, for example, a gas turbine engine. Thermal growth tends to be the greatest along the axial length of the tube which tends to induce stresses and bending at tube fitting and joint locations. Fluid conduits and related assemblies may tend to experience stresses resulting from stack up of axial tolerances due to thermal growth.

SUMMARY

In various embodiments the present disclosure provides a dynamic sleeve seal fitting, comprising a first sleeve having a tongue portion, a second sleeve having a groove configured to receive the tongue portion, and a first seal member coupled to at least one of the tongue portion or the groove and configured to generate a seal between the first sleeve and the second sleeve in response to inserting the tongue portion into the groove.

In various embodiments, a second seal member coupled to at least one of the tongue portion or the groove. In various embodiments, the first seal member is configured to seal between a radially inner surface of the groove and the tongue portion and wherein the second seal member is configured to seal between a radially outer surface of the groove and the tongue portion. In various embodiments, the first seal member and the second seal member are offset axially with respect to each other. In various embodiments, the first seal member is coupled to the radially inner surface of the groove and the second seal member is coupled to a radially outer surface of the tongue portion. In various embodiments, the dynamic sleeve seal fitting further comprises a third seal member and a fourth seal member each configured to generate a seal between the first sleeve and the second sleeve in response to a thermal expansion of the first sleeve and the second sleeve. In various embodiments, the third seal member is disposed proximate a base of the groove and configured to contact a tip of the tongue portion in response to the thermal expansion. In various embodiments, the fourth seal member is disposed proximate an inner surface shoulder of the first sleeve and configured to seal between the shoulder and an inner lip portion of the groove. In various embodiments, the second sleeve further comprises a flange portion. In various embodiments, each of the first sleeve and the second sleeve have a cylindrical structure.

In various embodiments, the present disclosure provides a gas turbine engine, comprising a compressor section configured to compress a gas, a combustor section aft of the compressor section and configured to combust the gas, a turbine section aft of the combustor section and configured to extract work from the gas, and a dynamic sleeve seal fitting, comprising a first sleeve having a tongue portion, a second sleeve having a groove configured to receive the tongue portion, and a first seal member coupled to at least one of the tongue portion or the groove and configured to generate a seal between the first sleeve and the second sleeve in response to inserting the tongue portion into the groove.

In various embodiments, a second seal member coupled to at least one of the tongue portion or the groove. In various embodiments, the first seal member is configured to seal between a radially inner surface of the groove and the tongue portion and wherein the second seal member is configured to seal between a radially outer surface of the groove and the tongue portion. In various embodiments, the first seal member and the second seal member are offset axially with respect to each other. In various embodiments, the first seal member is coupled to the radially inner surface of the groove and the second seal member is coupled to a radially outer surface of the tongue portion. In various embodiments, the dynamic sleeve seal fitting further comprises a third seal member and a fourth seal member each configured to generate a seal between the first sleeve and the second sleeve in response to a thermal expansion of the first sleeve and the second sleeve. In various embodiments, the third seal member is disposed proximate a base of the groove and configured to contact a tip of the tongue portion in response to the thermal expansion. In various embodiments, the fourth seal member is disposed proximate an inner surface shoulder of the first sleeve and configured to seal between the shoulder and an inner lip portion of the groove. In various embodiments, the second sleeve further comprises a flange portion.

In various embodiments, the present disclosure provides a method of generating a fluidic seal between a first conduit and a second conduit, comprising coupling a first sleeve to the first conduit and coupling a second sleeve to the second conduit, inserting a tongue portion of a first sleeve into a groove of a second sleeve, and generating the fluidic seal between the first sleeve and the second sleeve in response to inserting the tongue portion into the groove.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
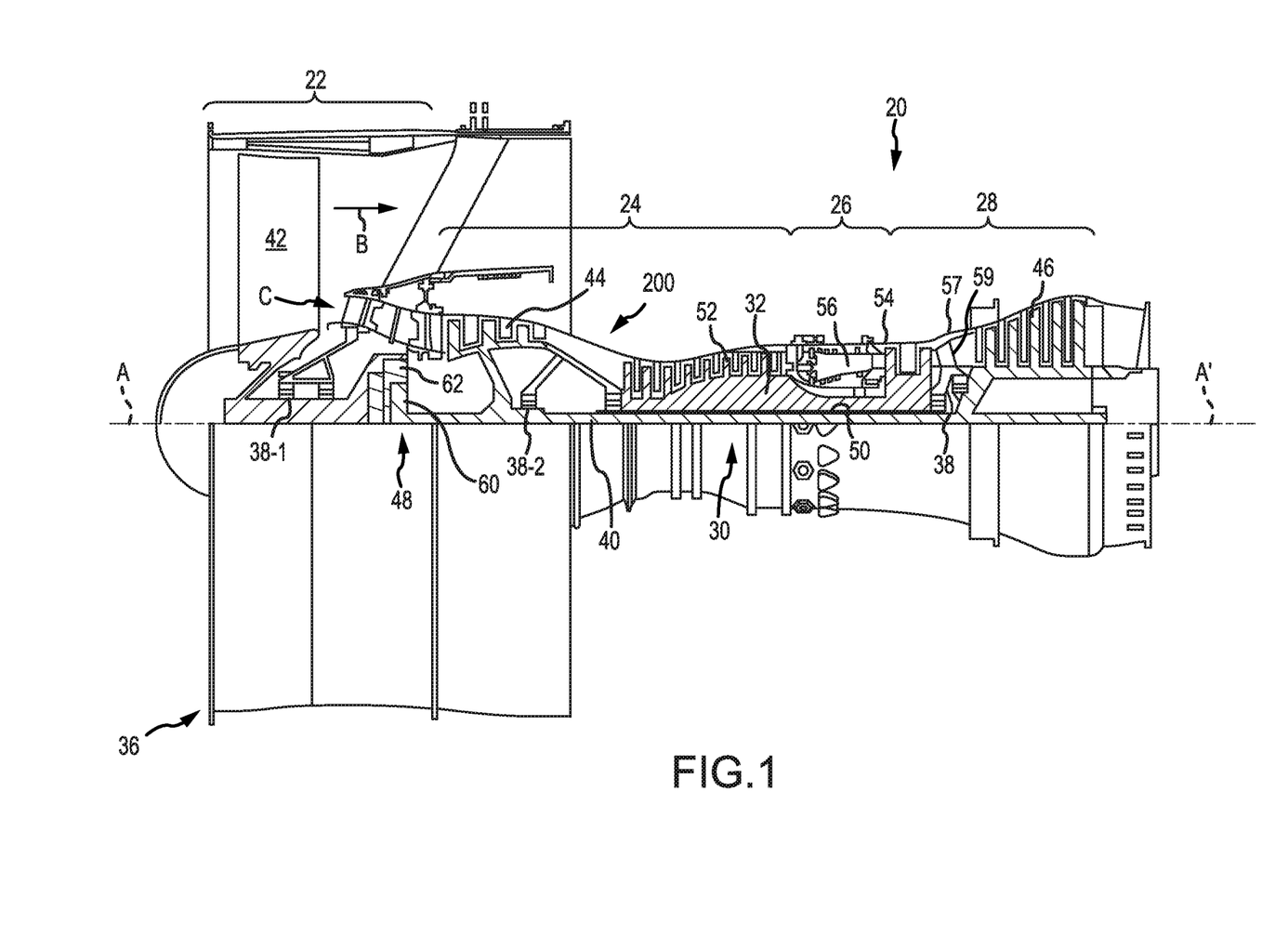
FIG. 1 illustrates an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive air along a bypass flow-path B while compressor section 24 can drive air for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including turbojet engines, a low-bypass turbofans, a high bypass turbofans, or any other gas turbine known to those skilled in the art.

Gas turbine engine 20 may generally comprise a low speed spool 30 and a high speed spool 32 mounted for rotation about an engine central longitudinal axis A-A' relative to an engine static structure 36 via one or more bearing systems 38 (shown as bearing system 38-1 and bearing system 38-2). It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 (also referred to a low pressure compressor) and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor ("HPC") 52 (e.g., a second compressor section) and high pressure (or second) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then HPC 52, mixed and burned with fuel in combustor 56, then expanded over high pressure turbine 54 and low pressure turbine 46. Mid-turbine frame 57 includes airfoils 59 which are in the core airflow path. Low pressure turbine 46, and high pressure turbine 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

In various embodiments, the next generation of turbofan engines may be designed for higher efficiency which is associated with higher pressure ratios and higher temperatures in the HPC 52. These higher operating temperatures and pressure ratios may create operating environments that may cause thermal loads that are higher than the thermal loads encountered in conventional turbofan engines, which may shorten the operational life of current components.

In various embodiments, HPC 52 may comprise alternating rows of rotating rotors and stationary stators. Stators may have a cantilevered configuration or a shrouded configuration. More specifically, a stator may comprise a stator vane, a casing support and a hub support. In this regard, a stator vane may be supported along an outer diameter by a casing support and along an inner diameter by a hub support. In contrast, a cantilevered stator may comprise a stator vane that is only retained and/or supported at the casing (e.g., along an outer diameter).

In various embodiments, rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or HPC) to increase and/or improve the efficiency of the engine and, more specifically, to achieve maximum and/or near maximum compression and efficiency when the straightened air is compressed and spun by rotor 64.

Figure 2A:
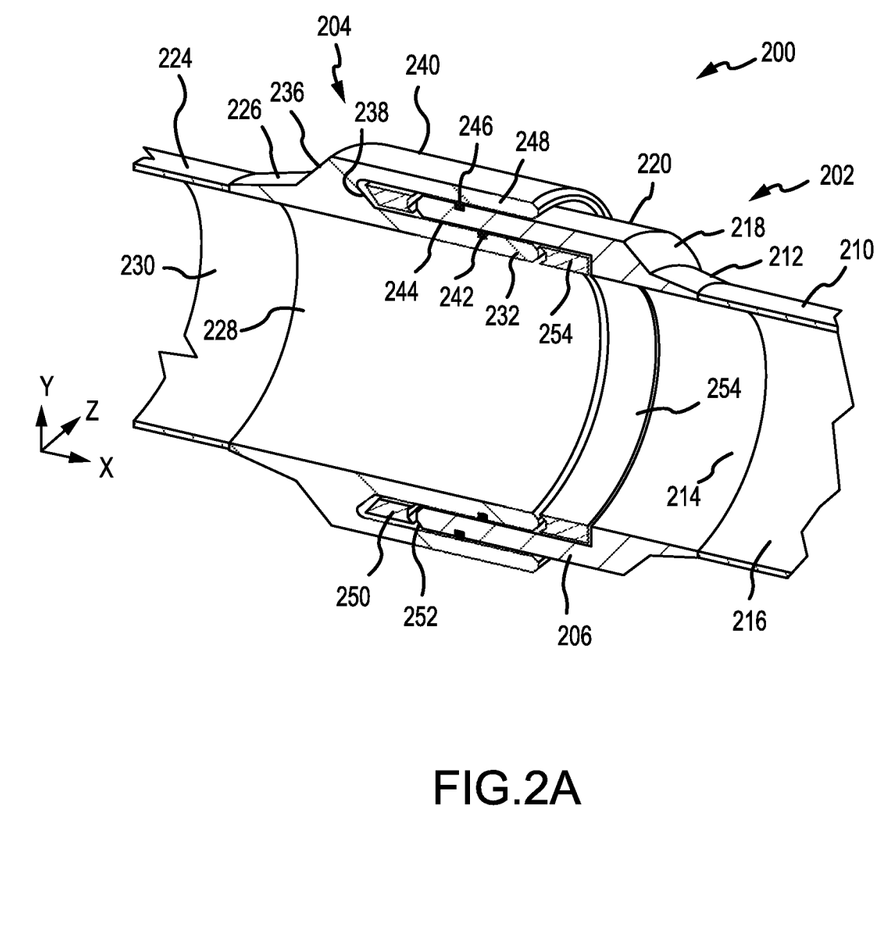
FIG. 2A illustrates a dynamic sleeve seal fitting, in accordance with various embodiments.
Figure 2B:
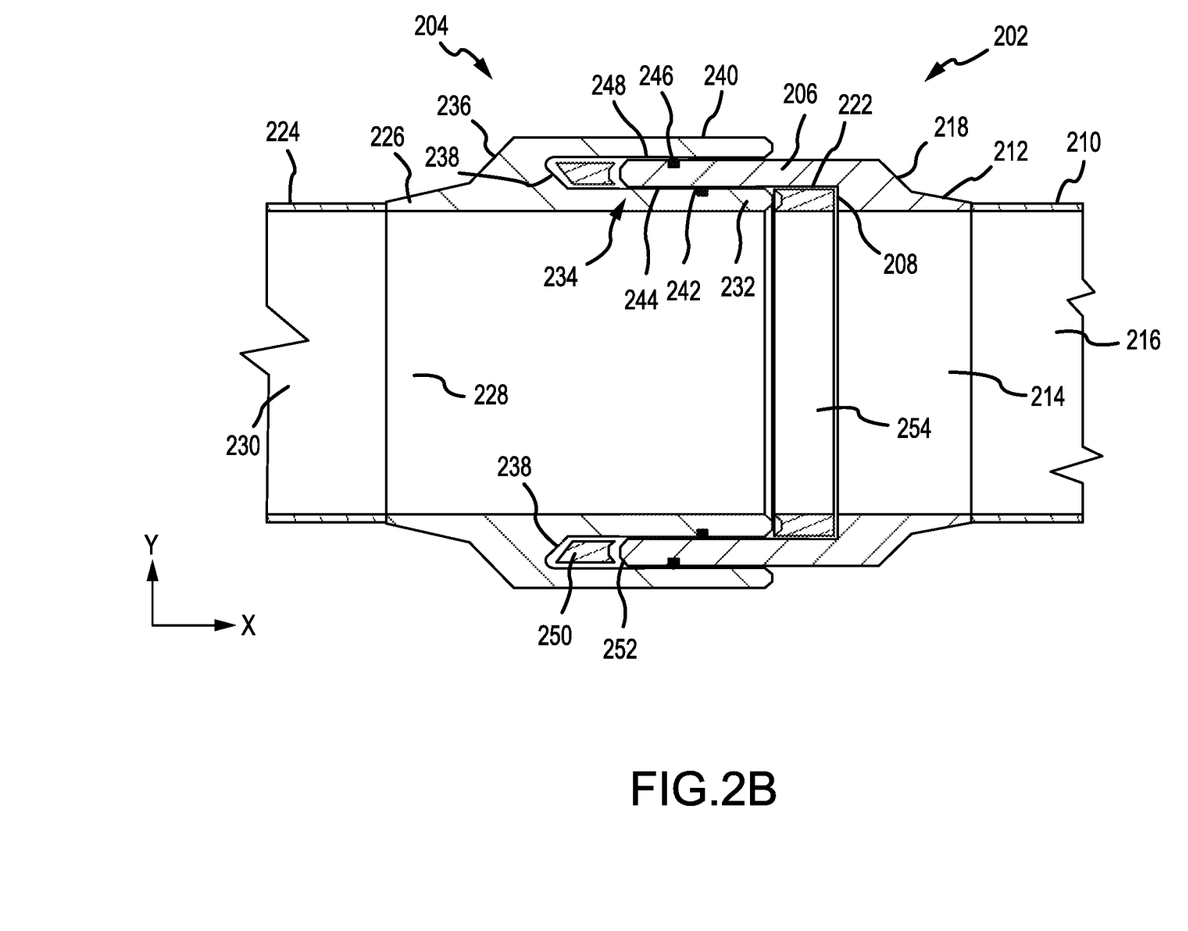
FIG. 2B illustrates a dynamic sleeve seal fitting, in accordance with various embodiments.

According to various embodiments and with reference to FIGS. 1, 2A, and 2B and dynamic sleeve seal fitting 200 may comprise a first sleeve 202 and a second sleeve 204. In various embodiments, the first sleeve 202 and the second sleeve 204 may comprise one of a cylindrical structure, an elliptical structure, a radial structure, a multi-radial structure, an angular structure, and/or the like. The first sleeve 202 has a tongue portion 206 which extends axially (along the X-axis) from inner surface shoulder 208. In various embodiments, the first sleeve 202 may be coupled to a first conduit 210 at a coupling portion 212 such that the inner surface 214 of the first sleeve 202 is flush with the inner surface 216 of the first conduit 210. The outer surface of the first sleeve 202 may slope relatively gradually upward (along the Y-axis) along the coupling portion 212. An outer surface shoulder 218 may thrust upward (along the Y-axis) from the outer surface of the first sleeve 202 relatively between the coupling portion 212 and the inner surface shoulder 208. In this regard, the outer surface shoulder 218 may define the radially outer surface 220 of the tongue portion 206. In like manner, the inner surface shoulder 208 may define the radially inner surface 222 of the tongue portion 206.

The second sleeve 204 is coupled to a second conduit 224 at a coupling portion 226 such that the inner surface 228 of the second sleeve 204 is flush with the inner surface 230 of the second conduit 224. The inner surface 228 extends axially (along the positive X-axis) forward to define an inner lip portion 232 of a groove 234. In a like manner to the first sleeve 202, the outer surface of the second sleeve 204 may slope relatively gradually upward (along the Y-axis) along the coupling portion 226. An outer surface shoulder 236 may thrust upward (along the Y-axis) from the outer surface of the second sleeve 204 relatively between the coupling portion 226 and the base 238 of the groove 234. In this regard, the outer surface shoulder 236 may define the outer lip portion 240 of the groove 234.

In various embodiments, one or more seal members may be coupled to the tongue portion 206 and or the groove 234. For example, a first seal member 242 is coupled to the radially inner surface 244 of the inner lip portion 232 of groove 234 and configured to generate a seal between the radially inner surface 244 of the groove 234 and the tongue portion 206. A second seal member 246 is coupled to the radially outer surface 220 of the tongue portion 206 and configured to seal between the tongue portion 206 and the radially outer surface 248 of the groove 234. In various embodiments, the first seal member 242 and the second seal member 246 may be offset axially (along the X-axis) with respect to each other when the first sleeve is coupled to the second sleeve. In various embodiments, the first seal member 242 and the second seal member 246 may generate a seal between the first sleeve 202 and the second sleeve 204 in response to inserting the tongue portion 206 into the groove 234.

In various embodiments, a third seal member 250 is disposed proximate base 238 of groove 234 and configured to contact a tip 252 of the tongue portion 206 in response to a thermal expansion (along the X-axis) of the first sleeve 202 and the second sleeve 204. In this regard, the third seal member 250 may be configured to generate a seal between the first sleeve 202 and the second sleeve 204. In like regard, a fourth seal member 254 may be disposed proximate the inner surface shoulder 208 of the first sleeve 202 and configured to seal between the inner surface shoulder 208 and the inner lip portion 232 of the groove 234. For example, the fourth seal member 254 may contact the inner surface shoulder 208 and the inner lip portion 232 in response to thermal expansion of the first sleeve 202 and the second sleeve 204. In this regard, the fourth seal member 254 may be configured to generate a seal between the sleeves (202, 204) in response to their thermal expansion along the X-axis. In various embodiments, the fourth seal member 254 may extend radially inward from the portion 206 of the first sleeve 202 to an inner diameter relatively flush with the inner surface 228 of the second sleeve 204 and the inner surface 214 of the first sleeve 202. In this regard, a fluid flow between the first sleeve 202 and the second sleeve 204 may tend to be relatively laminar.

In various embodiments, in response to inserting the tongue portion 206 into the groove 234 and generating the seal between the first sleeve 202 and the second sleeve 204, the tongue portion 206 may tend to support coupling and/or bending moment forces (along the Y-axis or X-axis) between the sleeves (202, 204). In this regard, a portion of the radially outer surface 220 of the tongue portion 206 may be a first bearing surface and a corresponding portion of a radially inner surface of the tongue portion 206 (proximate the inner lip portion 232) may be a second bearing surface. In various embodiments, the first sleeve 202 may be free to pivot or rotate (about the Z-axis) with respect to the second sleeve 204 and maintain the seal therebetween. In various embodiments, any of the third seal member 250 and/or the fourth seal member 254 may comprise geometries such as bellows, springs, cones, and/or the like to generate the seal and further may tend to dampen a vibratory response of the first conduit 210 and/or the second conduit 224. In various embodiments, any seal member may comprise synthetic rubbers, rubbers, plastics, composites, metallics, and/or the like.

Figure 3:
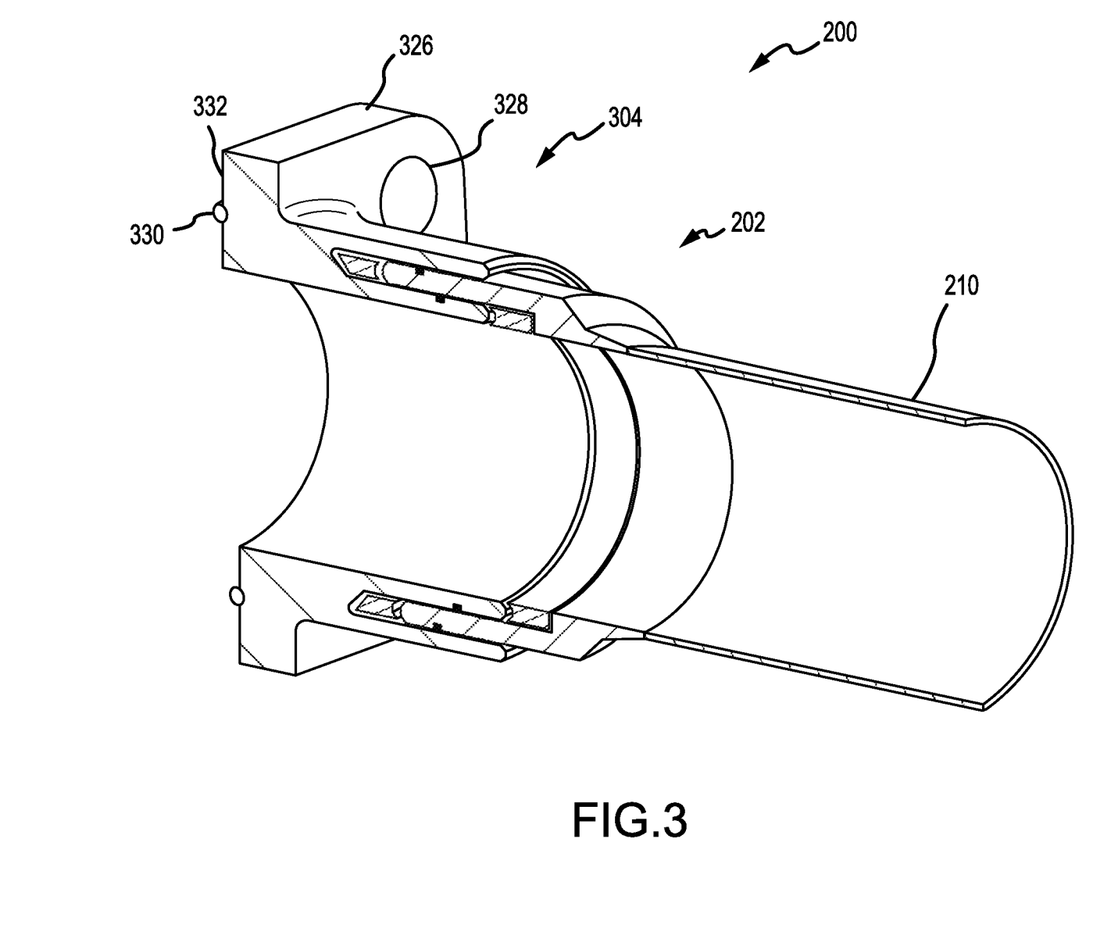
FIG. 3 illustrates a dynamic sleeve seal fitting, in accordance with various embodiments.

In various embodiments and with additional reference to FIG. 3, an additional embodiment of dynamic sleeve seal fitting 200 may comprise a first sleeve 202 and a second sleeve 304. Second sleeve 304 comprises features, geometries, construction, materials, manufacturing techniques, and/or internal components similar to second sleeve 204 but includes a flanged portion 326. In various embodiments, flanged portion 326 may include fastener holes 328 and a fifth seal member 330 at the flange face 332.

Figure 4:
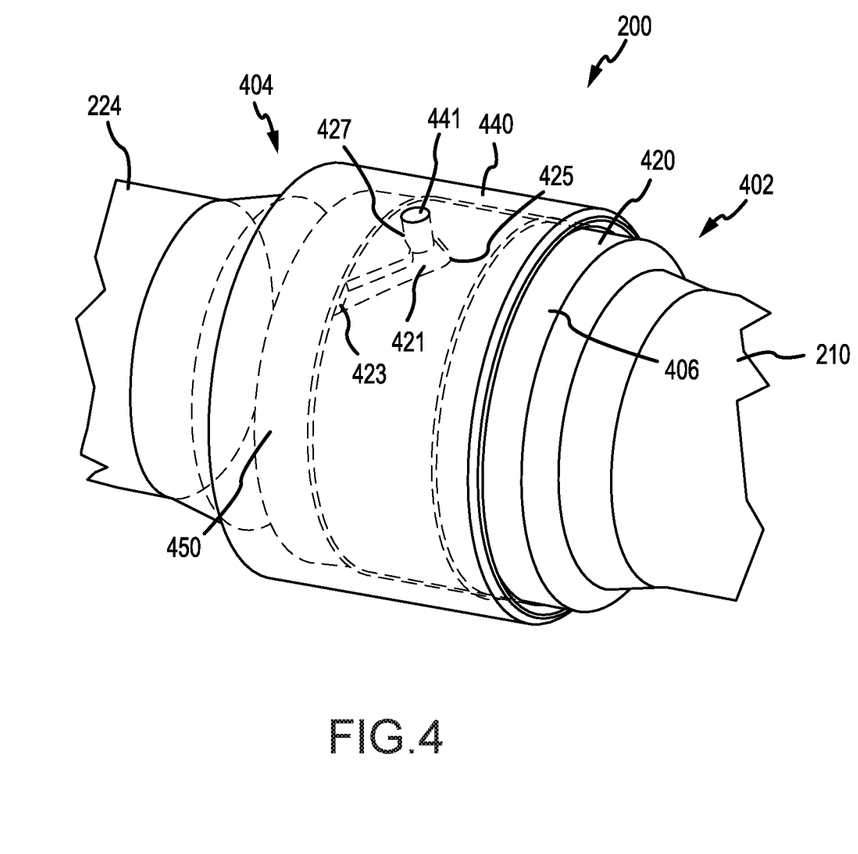
FIG. 4 illustrates a dynamic sleeve seal fitting, in accordance with various embodiments

In various embodiments and with additional reference to FIG. 4 an additional embodiment of dynamic sleeve seal fitting 200 may comprise a first sleeve 402 and a second sleeve 404. Second sleeve 404 is illustrated partially translucent for ease of viewing the features of the first sleeve 402. First sleeve 402 and second sleeve 404 comprises features, geometries, construction, materials, manufacturing techniques, and/or internal components similar to first sleeve 202 and second sleeves (204, 304). First sleeve 402 and second sleeve 404 differ in that radially outer surface 420 of the tongue portion 406 of the first sleeve 402 includes a J-slot 421 configured to engage with a pin 441 of the second sleeve 404. Pin 441 is coupled to the outer lip portion 440 of second sleeve 404 and extends partially radially into the groove into which the tongue portion 406 is inserted. In this regard the pin 441 may tend to inhibit insertion of the tongue portion 406 unless aligned with the mouth 423 of the J-slot 421. With the pin 441 aligned with the mouth 423 of the J-slot 421 tongue portion 406 may be rotated and inserted into the groove. Tongue portion may be further inserted into the groove tending thereby to compress the third seal member 450 and/or the fourth seal member (not shown) and the pin 441 may be traversed through elbow 425 of the J-slot 421 to rest at the foot 427 of the J-slot 421. The compressed third and fourth seal members may be held in compression against an interference between the pin 441 and the foot 427 of the J-slot 421. In this regard, the seal between the first sleeve 402 and the second sleeve 404 may be enhanced and the tongue portion 406 may tend to be inhibited from retraction out of the groove.

Figure 5:
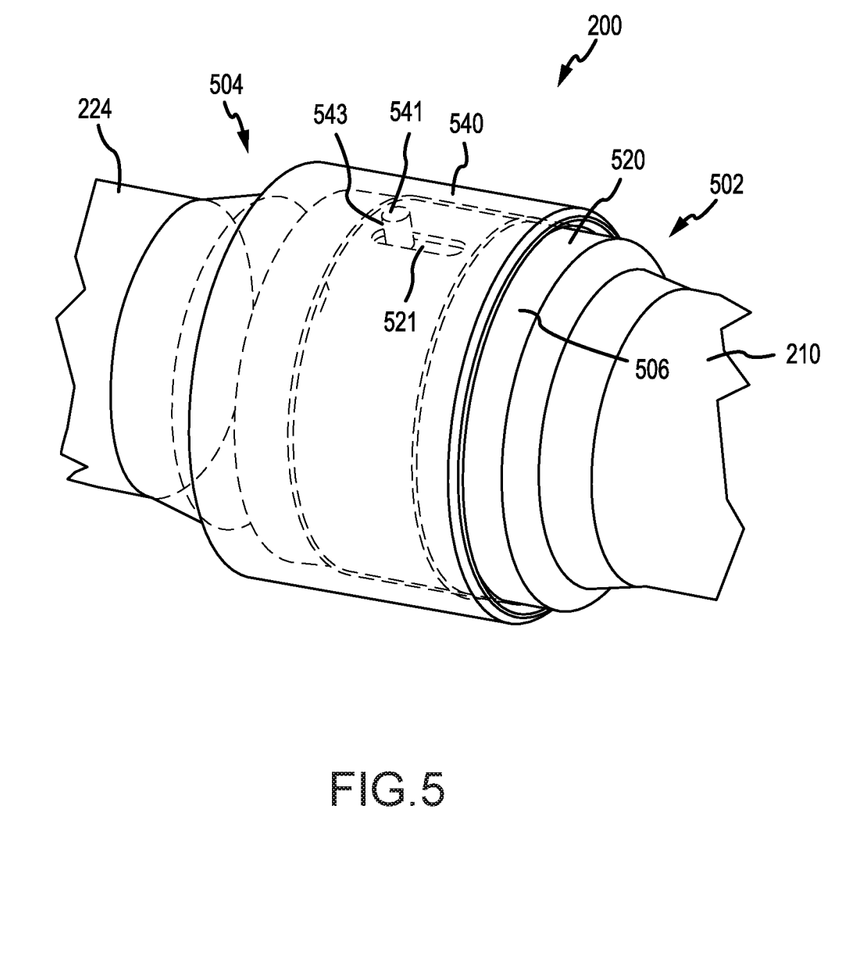
FIG. 5 illustrates a dynamic sleeve seal fitting, in accordance with various embodiments.

In various embodiments and with additional reference to FIG. 5 a further embodiment of dynamic sleeve seal fitting 200 may comprise a first sleeve 502 and a second sleeve 504. Second sleeve 504 is illustrated partially translucent for ease of viewing the features of the first sleeve 502. First sleeve 502 and second sleeve 504 comprises features, geometries, construction, materials, manufacturing techniques, and/or internal components similar to first sleeves (202, 402) and second sleeves (204, 304, 404). First sleeve 502 and second sleeve 504 differ in that radially outer surface 520 of the tongue portion 506 of the first sleeve 502 includes a slot 521 configured to engage with a fastener 541 (such as, for example, a pin or screw) of the second sleeve 504. Fastener 541 is removably coupled to outer lip portion 540 of second sleeve 504 at a penetration 543 through the outer lip portion 540 and extends partially radially into the groove into which the tongue portion 506 is inserted. The tongue portion 506 may be inserted into the groove and the slot 521 aligned with the penetration 543. The fastener 541 may be inserted into the penetration 543 and the slot 521 thereby inhibiting the tongue portion 506 from backing out of the groove. In various embodiments, the fastener 541 may be free to translate axially along the slot 521 in response to a thermal expansion of the sleeves (502, 504). Stated another way, the tongue portion 506 may translate axially with respect to the fastener 541 in response to the thermal expansion of the sleeves (502, 504).

Figure 6:
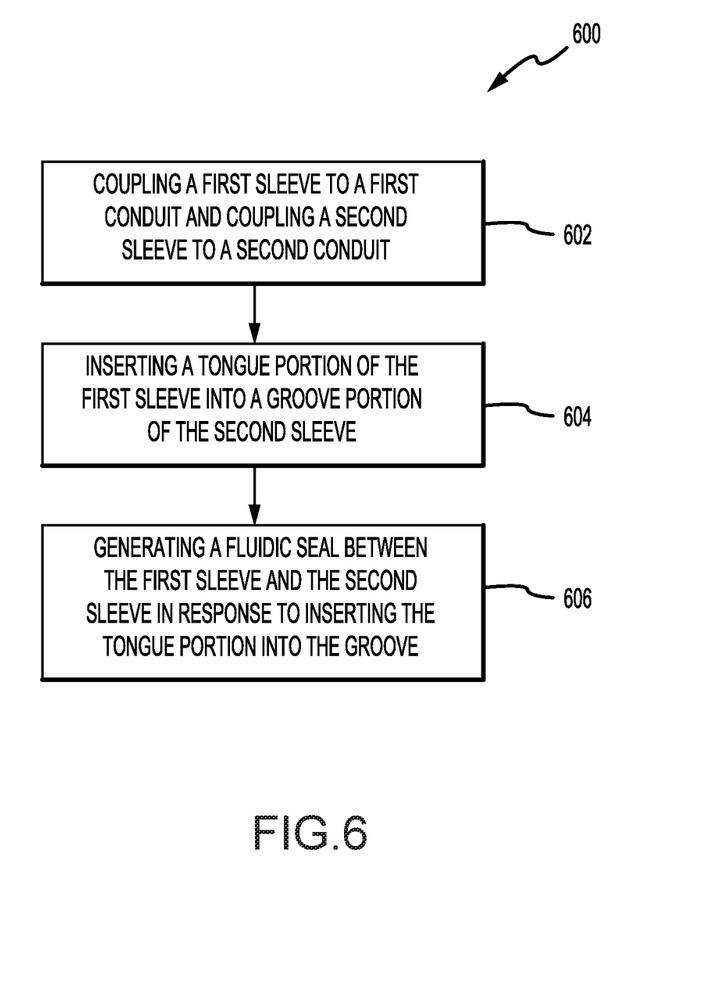
FIG. 6 illustrates a method of generating a fluidic seal, in accordance with various embodiments.

In various embodiments and with additional reference to FIG. 6, a method 600 of generating a fluidic seal between a first conduit and a second conduit may comprise coupling a first sleeve 202 to the first conduit 210 and coupling a second sleeve 204 to the second conduit 224 (step 602). Method 600 includes inserting a tongue portion 206 of the first sleeve 202 into a groove 234 of the second sleeve 204 (step 604). Method 600 includes generating the fluidic seal between the first sleeve 202 and the second sleeve 204 in response to inserting the tongue portion 206 into the groove 234 (step 606).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A dynamic sleeve seal fitting, comprising:
a first sleeve having a tongue portion;
a second sleeve having a groove configured to receive the tongue portion;
a first seal member coupled to at least one of the tongue portion or the groove and configured to generate a seal between the first sleeve and the second sleeve in response to inserting the tongue portion into the groove, wherein the first seal member is configured to seal between the tongue portion and a radially inner surface of the groove;
a second seal member coupled to at least one of the tongue portion or the groove, wherein the second seal member is configured to seal between the tongue portion and a radially outer surface of the groove; and
a third seal member and a fourth seal member each configured to generate a seal between the first sleeve and the second sleeve in response to a thermal expansion of the first sleeve and the second sleeve, wherein the fourth seal member is disposed proximate an inner surface shoulder of the first sleeve and is configured to seal between the inner surface shoulder and an inner lip portion of the groove.

2. The dynamic sleeve seal fitting of claim 1, wherein the first seal member and the second seal member are offset axially with respect to each other.

3. The dynamic sleeve seal fitting of claim 1, wherein the first seal member is coupled to the radially inner surface of the groove and the second seal member is coupled to a radially outer surface of the tongue portion.

4. The dynamic sleeve seal fitting of claim 1, wherein the third seal member is disposed proximate a base of the groove and is configured to contact a tip of the tongue portion in response to the thermal expansion.

5. The dynamic sleeve seal fitting of claim 1, wherein the second sleeve further comprises a flange portion.

6. The dynamic sleeve seal fitting of claim 1, wherein each of the first sleeve and the second sleeve have a cylindrical structure.

7. A gas turbine engine, comprising:
   a compressor section configured to compress a gas;
   a combustor section aft of the compressor section and configured to combust the gas;
   a turbine section aft of the combustor section and configured to extract work from the gas; and
   a dynamic sleeve seal fitting, comprising:
      a first sleeve having a tongue portion;
      a second sleeve having a groove configured to receive the tongue portion;
      a first seal member coupled to at least one of the tongue portion or the groove and configured to generate a seal between the first sleeve and the second sleeve in response to inserting the tongue portion into the groove; and
      a second seal member coupled to at least one of the tongue portion or the groove.

8. The gas turbine engine of claim 7, wherein the first seal member is configured to seal between a radially inner surface of the groove and the tongue portion and wherein the second seal member is configured to seal between a radially outer surface of the groove and the tongue portion.

9. The gas turbine engine of claim 8, wherein the first seal member and the second seal member are offset axially with respect to each other.

10. The gas turbine engine of claim 8, wherein the first seal member is coupled to the radially inner surface of the groove and the second seal member is coupled to a radially outer surface of the tongue portion.

11. The gas turbine engine of claim 8, further comprising a third seal member and a fourth seal member each configured to generate a seal between the first sleeve and the second sleeve in response to a thermal expansion of the first sleeve and the second sleeve.

12. The gas turbine engine of claim 11, wherein the third seal member is disposed proximate a base of the groove and configured to contact a tip of the tongue portion in response to the thermal expansion.

13. The gas turbine engine of claim 11, wherein the fourth seal member is disposed proximate an inner surface shoulder of the first sleeve and configured to seal between the inner surface shoulder and an inner lip portion of the groove.

14. The gas turbine engine of claim 7, wherein the second sleeve further comprises a flange portion.

15. A method of generating a fluidic seal between a first conduit and a second conduit, comprising:
   coupling a first sleeve to the first conduit and coupling a second sleeve to the second conduit;
   inserting a tongue portion of the first sleeve into a groove of the second sleeve; and
   generating the fluidic seal between the first sleeve and the second sleeve in response to inserting the tongue portion into the groove, the fluidic seal being generated by:
      a first seal member coupled to the groove, the first seal member being configured to seal between the tongue portion and a radially inner surface of the groove in response to the inserting the tongue portion into the groove;
      a second seal member coupled to the tongue portion, the second seal member being configured to seal between the tongue portion and a radially outer surface of the groove;
      a third seal member disposed proximate an inner surface shoulder of the first sleeve, the third seal member being configured to seal between the inner surface shoulder and an inner lip portion of the groove; and
      a fourth seal member disposed proximate a base of the groove, the fourth seal member being configured to contact a tip of the tongue portion.

* * * * *